No. 740,957.

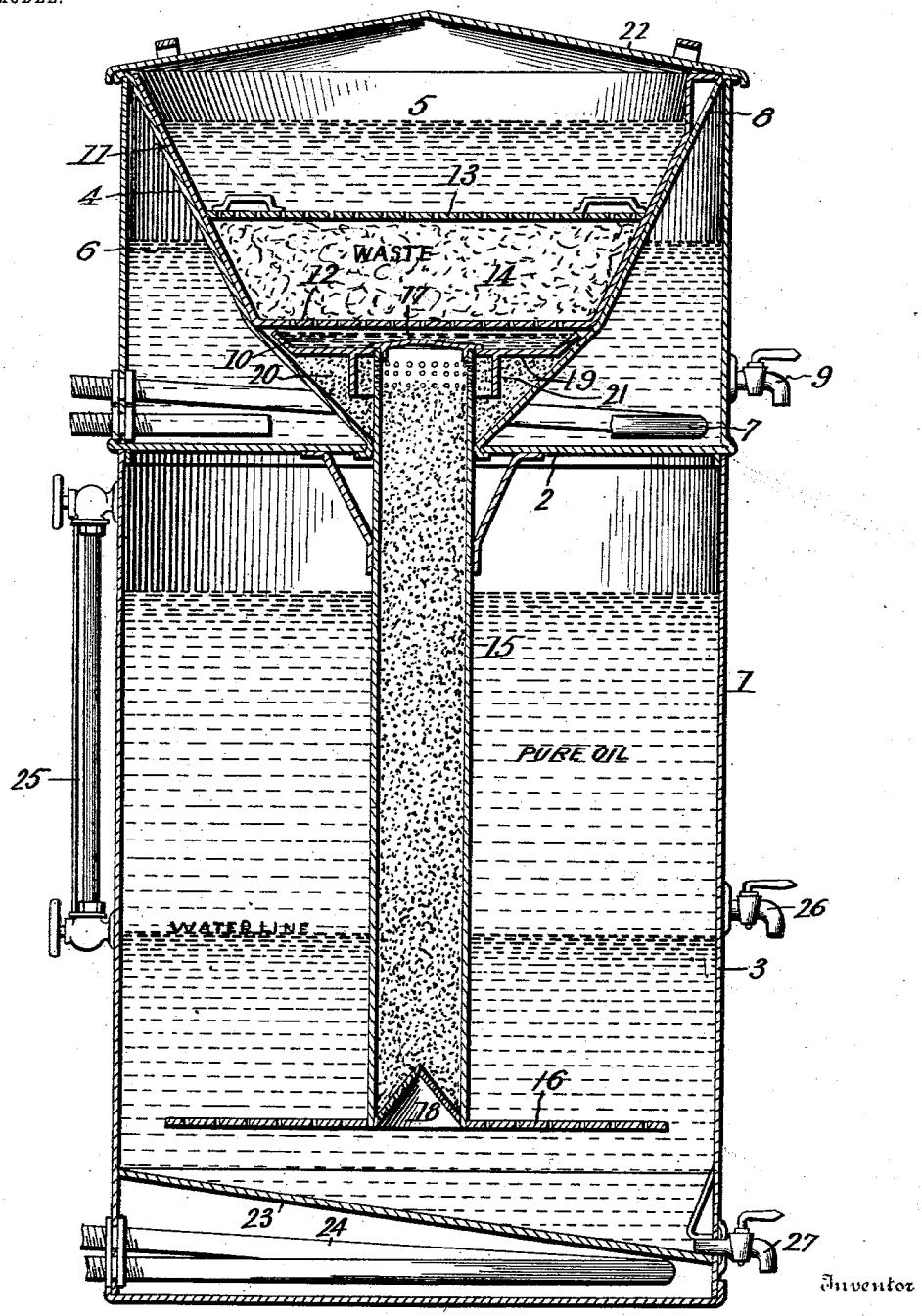

Patented October 6, 1903.

UNITED STATES PATENT OFFICE.

WILLIAM F. WARDEN, OF AKRON, OHIO.

OIL-FILTER.

SPECIFICATION forming part of Letters Patent No. 740,957, dated October 6, 1903.

Application filed March 25, 1903. Serial No. 149,558. (No model.)

*To all whom it may concern:*

Be it known that I, WILLIAM F. WARDEN, a citizen of the United States, residing at Akron, in the county of Summit and State of Ohio, have invented certain new and useful Improvements in Oil-Filters, of which the following is a specification.

This invention relates to improvements in oil-filters; and the object is to provide an improved construction of filter by means of which lubricating-oils that have become charged with foreign substances through use upon machinery may be quickly and thoroughly freed from such substances, washed, and delivered in a purified condition for further use.

With the above object in view the invention consists in the novel features of construction hereinafter fully described, particularly pointed out in the claims, and clearly illustrated by the accompanying drawing, which illustrates a longitudinal sectional view of a filter embodying the invention.

Referring now more particularly to said drawing, 1 designates a cylindrical tank divided by a partition 2 into a lower compartment 3, adapted to contain water and the purified oil, and an upper compartment divided by a substantially inverted conical-shaped wall 4 into a receiving-chamber 5 for the oil to be filtered, and a water-chamber 6, surrounding the sides of the oil-chamber. Arranged in the water-chamber is a heating-coil 7 for the purpose of heating the water in order to render the oil extremely fluid and facilitate the filtering process. Water is introduced into chamber 6 through an inlet 8 and may be removed therefrom through a cock 9.

Removably positioned in chamber 5 is a vessel 11 of such size as to leave below it a space or compartment 10, the bottom wall 12 of said vessel being perforated. The side walls of this vessel extend to and overlap the upper edge of chamber 5, so as to prevent oil from passing downward between the walls of said chamber and vessel. Formed in the lower portion of vessel 11 by a removable perforated plate 13 is a filtering-chamber 14, adapted to contain waste or other suitable filtering material.

Projecting upwardly into chamber 10 and extending downwardly into the lower compartment of the tank is a tube or pipe 15, the lower end of which terminates in close proximity to the bottom wall of the tank and is provided with a perforated plate 16 to spread the oil and subject it to the cleaning action of the water in compartment 3. This tube has its upper end closed by a removable cover 17 and is perforated near said upper end, while at its lower end it is provided with a perforated cone-shaped outlet 18. Said tube is adapted to contain a suitable filtering material—as, for instance, bone-black.

Positioned in chamber 10 at the upper end of tube 15 and below the perforated wall 12 of the first filtering-chamber is a pan 19, into which the oil passes from chamber 14 and from which it overflows into a filtering-chamber 20 formed therebeneath, said pan being of such size as to permit the oil to thus overflow into said lower or second filtering-chamber. Said chamber 20 contains a suitable filtering material, and depending from the under side of the pan thereinto is a ring-like deflecting-plate 21, which causes the oil to pass downward through the filtering material of said chamber before passing through the perforations of tube 15. The upper end of the tube 15 opens through the bottom wall of said pan, and the removable cover for the open end of the tube forms a part of the bottom wall of the pan.

The tank is provided at its upper end with a removable cover 22 and at its lower end with an inclined bottom 23, removed from the lower edge of the tank to provide a space for a heating-coil 24 for heating the water in the lower compartment. Said tank is also provided with a gage 25, a cock 26 to draw off the purified oil, and a cock 27, by means of which the water may be withdrawn from compartment 3.

The operation of the invention is as follows: The tank is filled with water up to the point marked "water-line" and water introduced into the chamber 6. The waste oil— that is, the oil to be filtered—is placed in the receiving-chamber 5, from which it passes through the perforated top wall of the first filtering-chamber and through the filtering material therein, where a portion of the impurities are removed. The oil then passes through the perforated bottom wall of said chamber and into the pan 19, where a portion of the sediment is removed. From this pan the oil overflows, passing downward through the filtering material of the second filtering-chamber and upward through the same (being caused to take this path by the deflecting-plate 21) and through the perforated upper end of tube 15 into said tube and downward through the filtering material therein. During this second and third filtering of the oil nearly all of the impurities are removed therefrom. The oil then passes through the perforated cone-shaped outlet of the tube, is spread upon the plate 16, where it is subjected to the washing action of the water, and passes up through the water in the lower compartment of the tank and is separated at the water-line, being delivered at this point in a filtered and purified condition.

Having thus fully described my invention, what I claim as new, and desire to secure by Letters Patent of the United States, is—

1. An oil-filter comprising a tank, an oil-receiving chamber for the oil to be filtered in the upper end of said tank, a filtering-chamber arranged to receive the oil from said oil-chamber, a second filtering-chamber arranged beneath said first-mentioned filtering-chamber, a tube leading from the second filtering-chamber to the lower portion of the tank, and a receptacle positioned between said filtering-chambers and arranged to receive oil from the first chamber and permit the same to overflow into the second filtering-chamber.

2. An oil-filter comprising a tank, an oil-receiving chamber for the oil to be filtered in the upper end of the tank, a filtering-chamber arranged to receive the oil from said oil-chamber, a second filtering-chamber arranged beneath the first-mentioned filtering-chamber, a receptacle positioned between said filtering-chambers and arranged to receive oil from the first and permit the same to overflow into the second filtering-chamber, and a tube containing filtering material communicating with the second filtering-chamber and extending downwardly to the lower portion of the tank.

3. An oil-filter comprising a tank, an oil-receiving chamber for the oil to be filtered in the upper end of said tank, a filtering-chamber arranged to receive the oil from said oil-chamber, a second filtering-chamber arranged beneath the first-mentioned filtering-chamber, a receptacle positioned between the filtering-chambers and arranged to receive the oil from the first and permit it to overflow into the second filtering-chamber, a tube communicating with the second filtering-chamber near the upper end of the latter and extending downwardly to the lower portion of the tank, and a deflecting-plate arranged in said second filtering-chamber to cause the oil to pass downwardly therein before passing upward to the tube.

In testimony whereof I have signed my name to this specification in presence of two witnesses.

WILLIAM F. WARDEN.

Witnesses:
H. I. PARSONS,
F. B. BURCH.